June 16, 1959          E. T. DALTON          2,890,551

APPARATUS AND METHOD OF FORMING OPHTHALMIC LENSES

Filed Feb. 20, 1956          7 Sheets-Sheet 1

INVENTOR
ERNEST T. DALTON
BY
Louis L. Gagnon
ATTORNEY

June 16, 1959 E. T. DALTON 2,890,551
APPARATUS AND METHOD OF FORMING OPHTHALMIC LENSES
Filed Feb. 20, 1956 7 Sheets-Sheet 2

INVENTOR
ERNEST T. DALTON
BY
Louis L. Gagnon
ATTORNEY

INVENTOR
ERNEST T. DALTON
BY
*Louis L. Gagnon*
ATTORNEY

June 16, 1959 E. T. DALTON 2,890,551
APPARATUS AND METHOD OF FORMING OPHTHALMIC LENSES
Filed Feb. 20, 1956 7 Sheets-Sheet 5

INVENTOR
ERNEST T. DALTON
BY
Louis L. Gagnon
ATTORNEY

June 16, 1959          E. T. DALTON          2,890,551
APPARATUS AND METHOD OF FORMING OPHTHALMIC LENSES
Filed Feb. 20, 1956          7 Sheets-Sheet 6

INVENTOR
ERNEST T. DALTON
BY
Louis L. Gagnon
ATTORNEY

Fig. 14

INVENTOR
ERNEST T. DALTON
BY
Louis L. Gagnon
ATTORNEY

United States Patent Office 2,890,551
Patented June 16, 1959

2,890,551

APPARATUS AND METHOD OF FORMING OPHTHALMIC LENSES

Ernest T. Dalton, Sturbridge, Mass., assignor to American Optical Company, Southbridge, Mass., a voluntary association of Massachusetts Application February 20, 1956, Serial No. 566,688

9 Claims. (Cl. 51—284)

This invention relates to improvements in multifocal lenses and has particular reference to the provision of novel means and method of simultaneously forming a plurality of onepiece multifocal lenses of the type having wide focal fields and a relatively straight line of division between said fields.

In the manufacture of multifocal lenses, it has been found that by forming the desired focal fields upon a single piece of lens medium superior quality may be obtained since past difficulties of expansion, interfacial defects, chromatic aberrations, etc., commonly encountered in forming multifocal lenses of the fused type embodying two or more pieces of different glasses, are eliminated. However, prior processes of forming such onepiece multifocal lenses have required the use of relatively involved, complicated and expensive manufacturing techniques wherein each lens had to be formed individually. This not only restricted production, but increased cost and greatly restricted the marketing of such lenses.

It, therefore, is a principal object of the present invention to provide new and improved apparatus and a relatively inexpensive process of producing a plurality of such onepiece multifocal lenses simultaneously with controlled optical characteristics and with the relatively straight transversely extending line of division between the focal fields maintained at a practical minimum height.

Another object is to provide an improved apparatus and process of forming lenses of the above character wherein the power introduced in the respective fields and the related optical centers thereof may be simply and accurately controlled.

Another object is to provide novel means and method of simultaneously generating a reading field of controlled power upon a portion of each of the optically finished distance fields of a plurality of lenses wherein said distance and reading fields will be divided by a substantially straight transversely extending line of division passing substantially through the respective optical centers of said distance and reading fields.

A further object is to provide a process for simultaneously making a plurality of onepiece multifocal lenses of the above character which embodies radially mounting a plurality of lens blanks, each having a controlled optically finished surface on one side thereof, upon a rotatable block while controlling the radial distance from said finished surfaces to the axis of rotation of said block in accordance with the radius of curvature desired of a second focal field to be subsequently provided upon a portion of said finished surfaces, mounting said block for axial rotation and automatically moving said rotating block transversely along a path normal to its axis of rotation to move the lens blanks carried thereby into engagement with the cutting edge portion of a first angled cup-shaped abrading tool, said tool being of a selected diameter and having its cutting edge of a coarse or rough texture, the angle of said tool relative to the axis of rotation of said block being of an amount sufficient to produce the desired radius of curvature in said second focal field, automatically controlling the extent of said transverse movement of said rotating block to precisely determine the depth of cut in said finished surfaces of the blanks, further automatically retracting said rotating block along said transverse path of movement and moving said blanks into engagement with the cutting edge of a second cup-shaped abrading tool disposed adjacent the opposed side of said rotating block and aligned with said transverse path of movement, said second abrading tool being of a selected diameter and of a fine grinding type and likewise angled relative to the axis of rotation of said block an amount precisely controlled to provide the desired radius of curvature in said second focal field, automatically and precisely controlling the extent of said movement of the block toward said second tool to provide the finish depth of cut desired and finally causing said block to automatically return to a position substantially midway between said first and second abrading tools.

Another object is to provide automatic means for simultaneously generating at least one of the desired focal fields of each of a plurality of lens blanks of the above type, said means embodying a spindle adapted to receive a wheel-shaped block having the blanks circumferentially disposed thereon, means for rotating said spindle and block to cause said blanks to revolve about the axis of said spindle, rotatable rough and fine grinding cup-shaped abrading members having their cutting edge diameters of known controlled dimensions and angularly disposed relative to the axis of said spindle, one at each side thereof, with their axes of rotation in a common plane with the axis of said spindle, means for rotating each of said abrading members and means for automatically moving said rotating spindle and block transversely in said common plane first towards said rough abrading member to cause a portion of each of said blanks to engage a cutting edge portion thereof, a first automatic stop means for limiting the extent of said movement toward said rough abrading member to determine the depth of cut in said blanks, further means for automatically causing said rotating spindle and block to be retracted from said rough abrading member upon reaching the desired depth of cut and moved into engagement with said fine abrading member, a second automatic stop means for limiting the depth of cut of said fine abrading member and simultaneously acting automatic means for causing said rotating spindle and block to be retracted from said fine abrading member and returned to a position along said transverse path of movement substantially midway between said rough and fine grinding members and to cease its rotation upon reaching said position whereby said block and blanks may be removed from said spindle.

A further object is to provide an improved, economical and simplified process of manufacturing multifocal lenses of the above character which will permit the marketing of such lenses at price comparable with the price of other present day types of multifocal lenses.

Other objects and advantages of the invention will become apparent from the following description taken in conjunction with the accompanying drawings in which.

Figures 1, 2, 3:
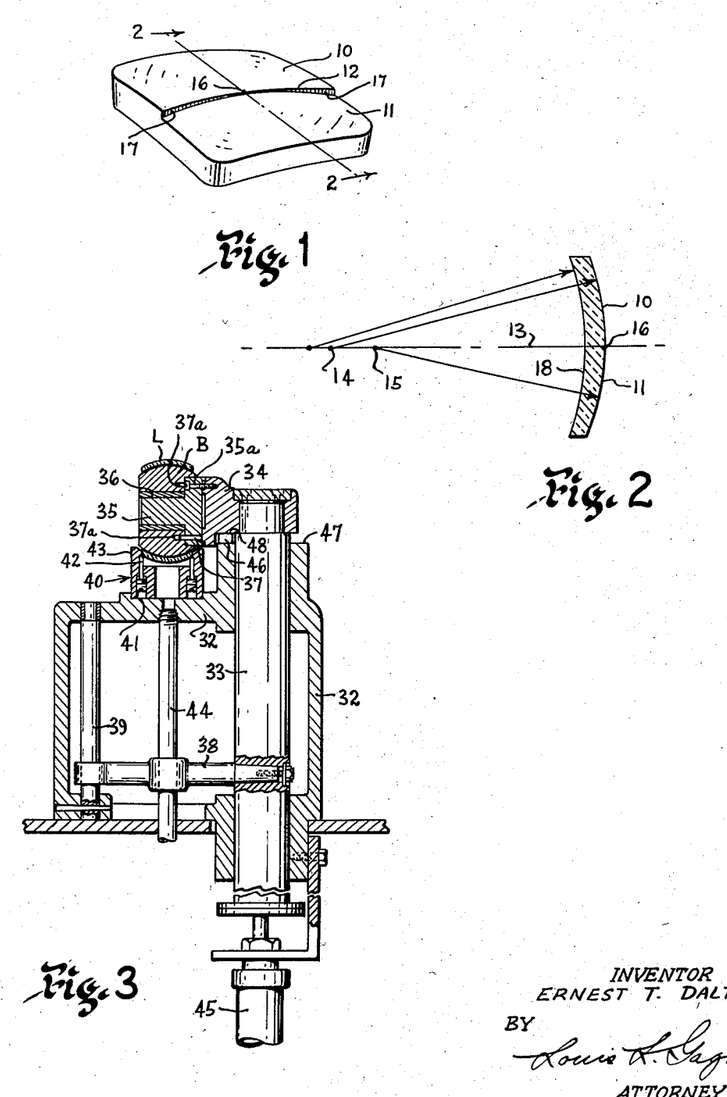
Fig. 1 is a perspective view of a lens blank formed in accordance with my invention.
Fig. 2 is a sectional view of the lens blank taken on line 2—2 of Fig. 1 looking in the direction of the arrows and including a diagrammatic illustration of the centering of its different focal fields.
Fig. 3 is a side sectional view of a preferred type of lens blocking apparatus to be used with the embodiment of my invention.

Referring more particularly to the drawings wherein similar reference characters represent similar parts thoughout, one form of a lens blank L embodying the invention is shown in Fig. 1 and comprises a single piece of lens medium, preferably optical crown glass or the like, having an upper or distance field 10 and a lower or reading field 11. The fields 10 and 11 are separated by a substantially straight dividing line 12 which passes through the optical axis of the lens blank so as to provide said lens blank with a wide reading field 11 extending transversely throughout the width thereof.

Referring more particularly to Fig. 2, wherein dot-dash line 13 represents the optical axis of the finished lens, it can be seen that the center of curvature 14 of the distance field 10 and the center of curvature 15 of the reading field 11 both lie on said axis line 13 and the optical centers 16 will, therefore, be in monaxial relation with each other and will lie on the dividing line 12 as illustrated in Figs. 1 and 2. Moreover, it is to be noted that the centers 14 and 15 of the curvatures of fields 10 and 11, respectively, are so positioned along the optical axis 13 as to provide a near mergence of said curvatures at said optical centers 16 and thus cause the dividing line 12 to be reduced to a minimum height adjacent said centers. This relation of the centers 16 substantially eliminates the error of "jump" when the line of vision of the eye passes from one field to the other. Dividing line 12, however, produces a ledge 17 which progressively increases in height toward the outer edges of the lens blank, which height on the opposed sides of the centers 16 is determined by the difference in curvatures of the fields 10 and 11.

The finished lens is formed by providing the opposed side of the lens blank with a finished optical surface 18 of a curvature which is such that when combined with the curvatures of the fields 10 and 11, it will give the required powers in said fields. The final thickness desired of the finished lens is controlled by the depth to which the surface 18 is formed.

In carrying out the present invention, a plurality of lens blanks L, preferably of optical crown glass or the like, having on the convex side thereof an optically finished surface of the curvature desired in the distance portion of the lens and each having the same thickness and shape are provided. Said finished surface is initially provided on the lens blanks by any one of the known standard methods of grinding and polishing which preferably incorporate the use of a multiple blocking arrangement for reasons of economy and will hereinafter be referred to as the base curve. The selection of lens blanks further includes the choice of the finished surface curvatures in accordance with the powers desired in the distance viewing portion of the resultant lens since the upper portion of said surfaces will remain untouched and will ultimately be used as the distance viewing portion of the finished multifocal lenses as will become apparent from the description to follow.

It is to be understood that the term "multifocal" as used in this specification and accompanying claims is intended to means lenses having two or more focal fields. However, in the description immediately following, the process of manufacturing lenses having only two focal fields, namely, a distance portion and a reading portion will be discussed. However, it will become apparent that lens blanks having more than two focal fields may also be manufactured by said process.

The selection of lens blanks L having been made in the above manner are then mounted on a wheel-type block B, such as shown in Figs. 3, 4, 6, 9 and 13 of the drawings. The lens blanks L are mounted upon the outer annular surface of said block by means of a precision blocking mechanism such as shown in Fig. 3 of the drawings.

The size of block B, however, must be selected in accordance with the particular surface curvature to be ultimately provided upon the reading field of the lens blanks which are mounted thereon. That is, the radial distance from the axis of rotation of the block to the lens blank mounting surfaces must be controlled in accordance with the desired radius of the curvature to be applied to the reading field so as to permit a relatively thin layer of pitch or suitable adhesive to be applied between the lens blanks L and said mounting surface of the block. However, in order to maintain a precise radial distance from the axis of rotation of the block to the ultimate reading portion surface 11 to be formed on the blanks L, which radial distance is equal to the radius of curvature of the reading portion curve, hereinafter referred to as the RP curve, precision spacer stops 46 specifically designed for each change in added power of the RP curves are used in conjunction with the blocking mechanism of Fig. 3. By so controlling the size of block B, the thickness of the above-mentioned pitch or adhesive between blanks L and the mounting surface of said block is maintained relatively thin and substantially constant throughout the range of the various sizes of blocks required for mounting blanks L. Any shrinkage of the pitch during its hardening would then be negligible and would not adversely effect the subsequent generating procedure.

The blocking mechanism of Fig. 3 comprises a base 32 having a vertically extending block carrying shaft 33 mounted for reciprocal movement therein. The upper end of shaft 33 is provided with a right-angled forwardly extending block supporting arm 34 rigidly secured thereto and having a reduced axle portion 35 of a diameter precisely controlled to intimately receive the hub portion 36 of a wheel-like block B. In addition, the axle portion 35 is rigidly mounted on arm 34 by studs 35a with its longitudinal axis normal to the longitudinal axis of shaft 33 and is provided with a locating pin 37 which is adapted to engage one of a plurality of matching orifices 37a in block B, when assembled therewith, to prevent rotation of said block relative to said axle portion 35 for purposes of indexing block B relative to the base 32 when applying lens blanks thereto as will be described immediately hereinafter.

In order to restrict shaft 33 from rotation and thus maintain axle portion 35 in a fixed transverse location relative to the base 32, a restraining arm 38 is secured at one end to shaft 33 and has its opposed end slidably mounted, in a vertical direction only, on a guide spindle 39 which, in turn, is rigidly secured in the base 32.

A removable blocking mould 40 generally square in shape is positioned in a recessed portion 41 of the base 32 and has its axis aligned with a line passing through the center of the width of the block B and intersecting the axis of rotation of axle portion 35. Mould 40 is provided with lens locating pins 42 of uniform length in each corner thereof for supporting a lens blank to be positioned therein in a given plane and has upwardly extending side portions 43 for engaging the edge of said lens blank and locating same in the above described axial relation with the block B.

It is pointed out, however, that mould 40 may be of any desired shape which shape would be dependent upon contour shape of the lens blanks to be applied thereto.

The blocking mechanism is further provided with a vacuum line 44 which is connected to the blocking mould recessed portion 41 for the purpose of setting up a vacuum of an amount to retain the blank in proper position on the pins 42. An air cylinder 45 or any other suitable motivating means is connected with the shaft 33 for the purpose of pneumatically moving the said shaft and the block B toward or away from the blocking mould 40.

Operation of the blocking mechanism is as follows:

Each of the lens blanks to be mounted on block B are provided with a suitable bonding agent upon the surfaces thereof opposed to the previously mentioned optically finished surfaces. In the case of the particular process illustrated and described herein, the bonding agent would be applied to the concave surfaces of the blanks. Although various types of bonding agents and methods of applying same to the blanks may be used, it has been found preferable to place a pellet or wafer of pitch or the like on the concave surface of each of the lens blanks and, in turn, place said lens blanks in a suitable oven or heating chamber to controllably heat and soften the pitch. The blanks are then removed, one at a time, from the heating chamber and placed in the blocking mould 43 with the convex surface resting on pins 42 in the blocking mechanism as shown in Fig. 3.

Attachment of a particular lens blank to the annular mounting surface of the block B is then accomplished by causing shaft 33 to be drawn downwardly upon proper actuation of air cylinder 45 whereupon the block will engage the softened pitch. However, since it is necessary to precisely control the radial distance from the axis of the block to the finished surface of the blank in accordance with the desired radius of curvature to be applied to the reading portion thereof, which radius will be equal to the desired radius of the RP curve, a removable spacer stop 46 of a precisely controlled thickness is placed upon a shouldered portion 47 of the base 32 adjacent the shaft 33 so as to be engaged by the under surface 48 of the arm 34 and thus limit the extent of downward movement of shaft 33 and so locate the axis of block B at a predetermined distance above the blocking mould 40.

Since each desired change in power of the RP curve requires a change in the radial distance from the axis of block B to the finished surface of the blanks mounted thereon, a particular spacer stop 46 of a controlled thickness is provided for each RP change within the range of powers which may be used with a particular block B.

It can then be seen that by controlling the distance from the tops of pins 42 in mold 40, upon which the finished surface of the lens blank is rested, to the plane of shoulder 47 and by the proper selection of the thicknesses of spacer stop 46, the desired RP radius is obtained and the remaining space between the concave surface of the blanks and the mounting surface of block B will be filled by the pitch.

The vacuum line 44 is used to create a partial vacuum internally of mould 40 and thus retain the lens blank in proper seated relation upon pins 42 during the blocking operation.

The above blocking operation is repeated by properly actuating air cylinder 45 and causing shaft 31 and block B to be raised, thus lifting the lens blank now attached thereto out of mould 40 since the adherence of the pitch is sufficient to overcome the holding force of the vacuum created internally of mould 40. Additional blanks are positioned one at a time in mould 40 in the above manner and the block B is indexed to a clear position on the mounting surface thereof prior to each application by partially withdrawing block B from axle 35 an amount sufficient to clear the locating pin 37 and rotating said block B to a clear position on the mounting surface thereof which will be aligned with a second orifice 37a. The block B is then pushed inwardly upon axle 35, whereupon locating pin 37 will engage in said second orifice 37a to properly locate block B relative to mold 40 and the operation described above is repeated for each lens blank until the desired number of lens blanks are mounted upon the mounting surface of block B.

It is pointed out that the number of lens blanks which may be applied to a particular block is dependent upon the RP radius and also the size of lens blanks to be applied thereto. Moreover, the lens blanks are preferably positioned in close edge-to-edge relation about the lens block mounting surface and if the related sizes of the block and lens blanks are such as to leave a relatively wide spacing between the first and last lens blanks, it is also preferable to fill said space by similarly mounting a glass filler therebetween. This provides a substantially continuous glass surface to be abraded and polished in the operations to follow and allows the abrading and polishing tools to pass over said space without sharply striking the edges of the adjacent lens blanks as will become apparent in the following description.

It is also pointed out that in order to maintain the above-mentioned distance from the top of pins 42 in mould 40 to the plane of shoulder 47 substantially constant, in connection with each change in block size, it is necessary to provide an individual mould 47 of the proper height and having proper length of pins to bring about this result. The block size is determined by the RP curve of the lens blanks to be processed thereon, as described hereinabove.

After having blocked the lens blanks in the above manner, the block B is then removed from the blocking device and the desired RP curve is generated upon the finished surfaces of the lens blanks in the following manner.

The block B and attached lens blanks L are secured on one end of and in axial alignment with a rotatable spindle 50 of the lens surface generating device, illustrated in Figs. 4, 6, 9, 10 11 and 12 of the drawings. Spindle 50 is initially positioned substantially midway between a pair of rotatable angled cup-shaped rough and fine, preferably diamond charged, abrading tools 51 and 52 respectively. Said tools are each adapted to be pivoted at points 51a and 52a respectively and angled with respect to spindle 50 so as to have their axes of rotation in a common plane with, and each intersecting said axis of spindle 50. Furthermore, the pivot points 51a and 52a are each located at the lowest point on the cutting edge of the respective tools, and since it is desired that the dividing line 12 be formed to extend transversely through the ultimate location of the optical centers 16 of the lens blanks L, the pivot point 52a of the fine or finish abrading tool 52 is positioned so as to lie in a horizontal plane passing through said ultimate location when block B is positioned upon spindle 50, as illustrated best in Figs. 4 and 9. Pivot point 51a, however, is positioned slightly above said horizontal plane preferably about $\%_{64}$ of an inch to cause the cutting edge of the coarse or rough abrading tool to initially form said dividing line 12 on lens blanks L slightly above the ultimate location of the optical centers 16 thereof.

This slightly raised condition of tool 51 is provided to protect the immediate area in which the dividing line 12 is to be finally formed by tool 52 from damage due to possible glass flaking which might be caused by the coarseness of the abrading particles of tool 51. It is pointed out that tool 51 is used to form the general shape of the final RP curve as will become apparent from the description to follow.

Figure 5:
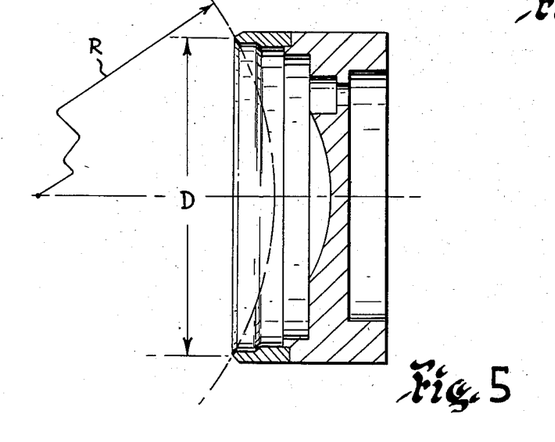
Fig. 5 is a sectional view of one of the cup-shaped abrading tools of said lens generating device.

Tools 51 and 52 are provided with a controlled diameter D and a formed radius of curvature R, Fig. 5, upon the cutting edges thereof, radius R being equal to the radius of curvature of the RP curve to be generated on blanks L. A particular pair of tools 51 and 52 is provided for each desired change in RP curvature and the radius R of said tools is designed to cause a true continuous RP curvature to be generated from the ledge 17 of blanks L to the outer edges thereof when the tools are properly angled with respect to the axis of spindle 50.

The extent to which tools 51 and 52 are angled with respect to the axis of spindle 50 is geometrically determined by the ultimate RP curve desired to be generated upon the blanks L. That is, for example, if it is desired to provide the blanks L with an RP curve of a 76.335 m./m. radius, the tools 51 and 52 selected would have a cutting edge diameter of 3.125 inches, a radius R of 76.335 m./m. and the rough abrading tool 51 would be set at an angle of 32°13' from the axis of spindle 50, and the fine abrading tool 52 would be set at an angle of 31°19' from the axis of spindle 50. However, if it is desired to provide blanks L with an RP curve of a 66.769 m./m. radius, the tools 51 and 52 would be selected to have a diameter D of 3.125 inches, a radius R of 66.769 m./m. and tool 51 would be angled to 37°29' whereas tools 52 would be angled to 36°28', etc.

It is pointed out that the tool dimensions and angular settings are precisely calculated for each RP curvature required by the optical profession and that three major factors are necessary to generate the desired RP curve on the lens blanks L. These factors are: first, blocking the blanks to provide a predetermined radial distance from the axis of rotation of the block to the surfaces of the blanks; second, selecting tools having the proper cutting edge diameters D and radii R and, third, properly angling each of the abrading tools with respect to the axis of rotation of the block so as to generate in the transverse meridian of the blanks a radius of curvature which is substantially equal to the radius of curvature generated in a meridian normal thereto and resulting from the rotation of said blanks about the axis of the block. This is to cause said RP surfaces to be spherical in power.

By referring to "the diameter of the cutting edge of the abrading tools," it is intended to mean the diameter D, Fig. 5, measured at the apex of the leading abrading edge portion thereof.

The RP curve is then generated on the lens blanks L by causing the rotating spindle 50 and blocked lens blanks L attached thereto to be moved transversely in the above-described common plane with the axes of rotation of the abrading tools, so as to first engage the rough abrading tool 51 whereupon the abrading action of the tool 51, due to its rotation and the rotation of lens blanks L about the axis of block B, will cause the straight line of division 12 and the ledge 17 to be formed simultaneously with the forming of the RP curve which curve is controlled by the shape and angle of the tool and the radial distance from the axis of block B to the surfaces of blanks L. Said transverse movement is continued until the desired depth of cut is obtained. Since the tool 51 is of a coarse or rough abrading type which is used to form only the general shape of the ultimate RP curve for purposes of expediting the generating operation, the rotating spindle 50 is next caused to retract from tool 51 and is moved in the opposite direction along said common plane an amount sufficient to cause the blanks L to engage the tool 52 which is, in turn, the fine or finish abrading tool. Spindle 50 is caused to continue its transverse movement in the direction of tool 52 until a predetermined depth of finish cut is accomplished which depth of cut is controlled to cause the curvatures of the previously finished surface of the lenses and the new RP curvatures to nearly merge at the ultimate location of the optical centers 16 of each of the finished lenses. At this point, the spindle 50 is caused to retract from tool 52 and assume its initial position between tools 51 and 52. It will be noted that due to the relative vertical positions of the tools 51 and 52 and the blocked blanks L, that approximately one-half of the side area of the blanks L is provided with the RP curve and the remaining half has the untouched finished base curve thereon. This base curve ultimately becomes the distance viewing portion of the finished lens.

Figure 7:
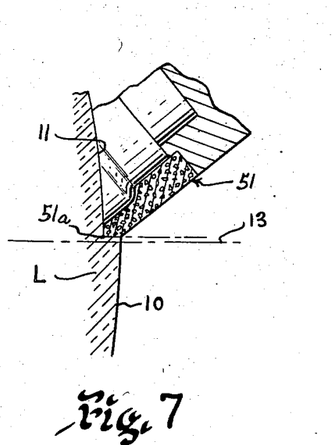
Fig. 7 is a diagrammatic illustration of the rough generating of the lens blanks embodying my invention.
Figure 8:
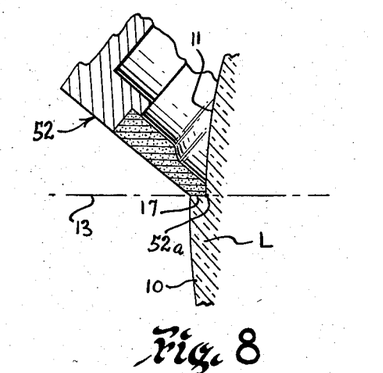
Fig. 8 is a view generally similar to Fig. 7 illustrating the fine generating of said lens blanks.

Referring more particularly to Figs. 7 and 8 which diagrammatically illustrate the forming of the ledge 17 on lens blanks L during the generation of the reading portion 11, it will be noted from Fig. 8 that the ledge 17 is finally finished to have its surface lie in the plane of the optical axis 13 of the lens blanks L which plane is also coincident with the pivot point 52a of the abrading tool 52.

Since it is preferred to have the plane of the surface of ledge 17 substantially coincident with said plane of the optical axis 13 of the lens blanks L so as to prevent the undesired effects of prism displacement when the line of vision of the wearer's eye passes over ledge 17 while shifting from one focal field to another, the abrading edge portions of tools 51 and 52 are formed to controlled angular shapes for each change in RP curve to be generated. That is, a different set of tools 51 and 52 each having a proper angularly shaped cutting edge portion is selected in accordance with the degree of tilt required to produce the desired RP curve and the said angle in each instance is such as to cause the resultant cliff edge 17 of the dividing line 12 to be formed in a plane parallel with the axis 13 and lying on said axis.

It will be noted in the previously described examples of the angular settings of tools 51 and 52 that the angular setting of the rough abrading tool 51 for each particular RP curve is approximaely one degree greater than that of the fine or finish abrading tool. This increased tilting of tool 51 about point 51a, in effect geometrically causes the rough RP curve to be formed at substantially the same radius of curvature as the fine RP curve which is generated by tool 52 regardless of the above-mentioned slightly raised condition of tool 51 which prevents possible slight flaking of the glass from reaching and damaging the ultimate dividing line 12 of the lens blanks L.

As described hereinbefore, the tool 51 is used to form only the general shape of the RP curve and ledge 17.

The finish abrading tool 52, Fig. 8, is so angled as to cause the plane of the ledge 17 to be properly formed substantially coincident with the plane of axis 13 since the fine grain of the abrading particles therein produce substantially no flaking of the glass and provides a clean cut line of division 12 between the adjacent fields 10 and 11.

Figure 9:
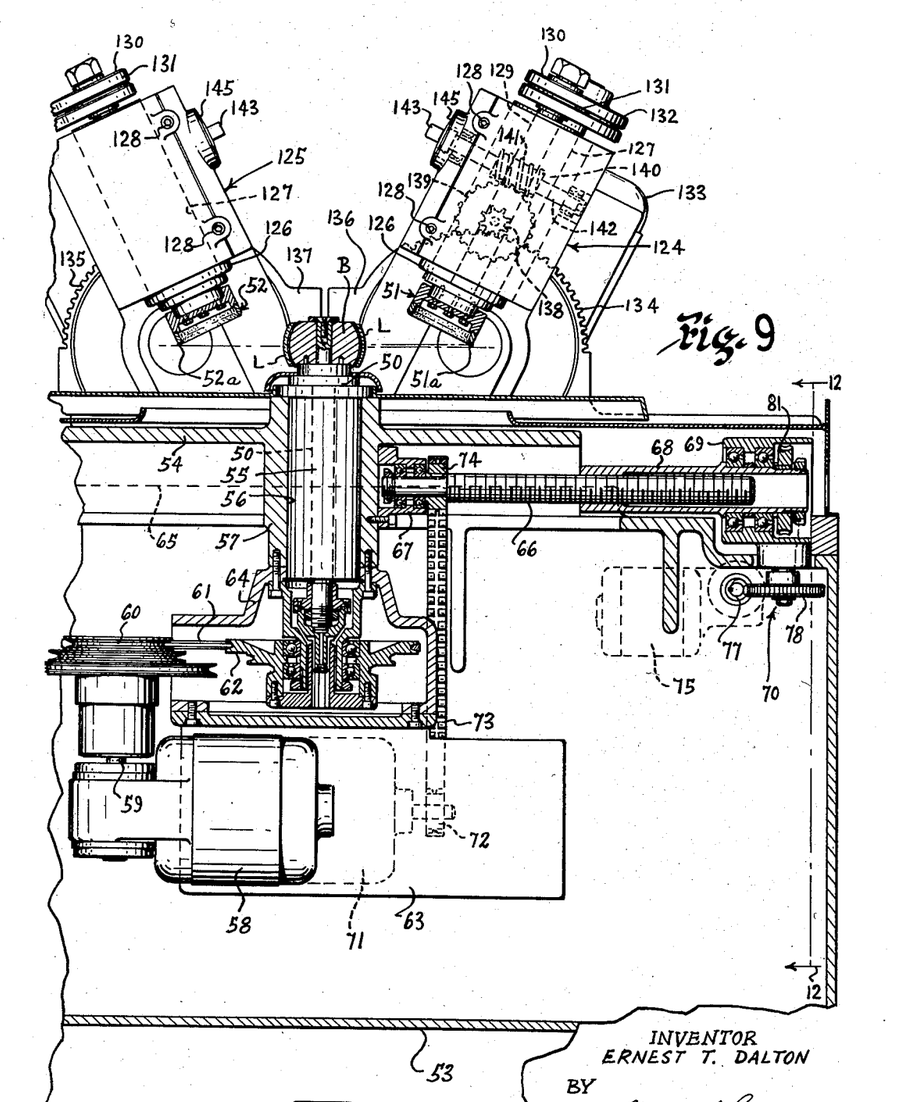
Fig. 9 is a fragmentary sectional view taken substantially on line 9—9 of Fig. 6 and looking in the direction of the arrows.

It is particularly pointed out that due to the fact that the lowermost ends or apices of the cutting edges of the tools are located on the axis of the pivots 51a and 52a, as shown particularly in Figs. 7, 8, and 9, no shifting of the position of said lowermost ends or apices with respect to said axes takes place during the angling of the tool.

The block B is next removed from spindle 50 and the final finishing of the generated RP curvatures is accomplished by a polishing operation to be described hereinafter.

The above-described generating procedure, however, is automatically performed by the generating device of Figs. 4, 6, 9, 10, 11 and 12 wherein said device comprises in addition to tools 51 and 52 and spindle 50, a base 53 having a transversely slidable table 54 mounted on the upper surface thereof. Spindle 50 is journaled in a vertically extending housing 55 which, in turn, is rigidly secured in the longitudinal bore 56 of an enlarged depending supporting portion 57 of table 54. Rotation of spindle 50 is accomplished by means of a drive motor 58 which is coupled to the lower end of said spindle 50 by a drive shaft 59 having a pulley 60 mounted thereon and a connecting belt 61 engaging a second pulley 62 which, in turn, is splined to shaft 50. Said spindle drive mechanism is rigidly secured to and movable with table 54 by means of a combined motor bracket 63 and pulley housing 64 which housing is bolted or otherwise secured to the underside of the spindle supporting portion 57 of table 54.

Figure 12:
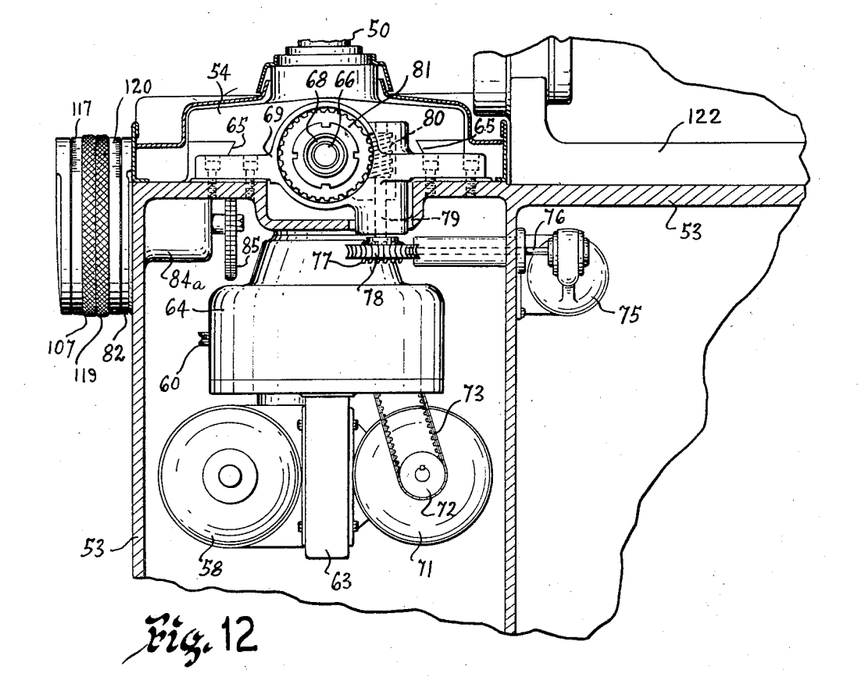
Fig. 12 is a fragmentary sectional view taken substantially on line 12—12 of Fig. 9 and looking in the direction of the arrows.

In order to move the table 54 transversely along the top of base 53 which path of movement is in the common plane of the axes of the spindle 50 and of the tools 51 and 52 and is guided by suitable tracks or guideways 65, one at each side thereof, Figs. 9 and 12, a lead screw 66 is rotatably secured at one end thereof by a bearing support 67 to the spindle supporting portion 57 of table 54 and the opposed end of said lead screw 66 is threadedly engaged in a sleeve 68. Sleeve 68 is, in turn, mounted for rotation in a stationary housing 69 rigidly secured to the base 53.

As described hereinabove, the spindle 50, carrying block B, is to be moved first into engagement with tool 51 and secondly into engagement with tool 52 and returned to its initial position substantially midway therebetween to effect the desired generating procedure. However, it is a well-known fact in the trade that during a lens cutting or generating operation, the lenses must be fed relatively slowly into an abrading tool in order to prevent undue flaking of the glass or damage thereto. For this reason, the lead screw 66 is powered for rotation in either direction by a controllable slow speed drive unit 70. However, in order to expedite the movement of lenses L on block B throughout their course of travel between their points of engagement with tools 51 and 52, lead screw 66 is also powered for rotation in either direction by a high speed drive mechanism embodying a high-speed reversible motor 71 having a sprocket 72 on its shaft. A chain belt 73 is positioned upon sprocket 72 and extends upwardly and over a second similarly shaped sprocket 74 which is keyed to lead screw 66. With the sleeve 68 held stationary in housing 69, rotation of motor 71 in one direction will, through sprockets 72 and 74 and chain belt 73, cause the lead screw 66 to rotate and advance into sleeve 68 thus drawing table 54 towards tool 51 whereas rotation of motor 71 in the opposed direction will cause lead screw 66 to retract from sleeve 68 and move table 54 in the opposed direction.

The slow speed drive, however, is powered by a reversible motor 75 which is geared to a horizontal shaft 76 having a worm gear 77 at its opposed end engaging a worm follower 78 on a second shaft 79 extending vertically to a second worm gear 80, Figs. 9 and 12. Worm gear 80 then engages a second worm follower 81 which is keyed to sleeve 68 whereby rotation of motor 75 will, through the above gears and shafts, cause sleeve 68 to be rotated in housing 69.

In operation, motor 75 is initially de-energized which, due to the inherent braking effect of the worm gears and worm followers, prevents sleeve 68 from rotating in housing 69 thus allowing motor 71 to be energized so as to rotate in the proper direction to operate lead screw 66, as described above, and rapidly move table 54 to bring the blanks L to a point spaced a short distance from the tool 51 whereupon motor 71 will be deenergized and stopped. Motor 71 is preferably of a type embodying a conventional spring set magnetic braking means which functions to brake and stop the rotation thereof when said motor is de-energized. By said braking effect, lead screw 66 will be held stationary. Motor 75 is then energized to rotate at a given maximum speed which is considerably slower than speed of motor 71 and, in turn, rotate sleeve 68 and cause lead screw 66 to be drawn inwardly thereof which will cause table 54 to continue its movement at a slower rate towards tool 51. Upon reaching a point immediately prior to the engagement of lens blanks L with tool 51, the motor 75 is electrically controlled to cause table 54 to continue its movement toward tool 51 at a predetermined slower generating speed.

The purpose of including the first-mentioned slow speed of motor 75 is to provide a progressive slowing down of the table 54 from the rapid speed of motor 71 to an ultimate still slower generating speed. This still slower speed is brought about by an electrical variac in the circuit of motor 75 and thus prevents any possible overtravel of motor 71, during its braking period, from causing lens blanks L to engage tool 51 at a speed faster than the desired predetermined slow speed. The automatic electrical means, Fig. 14, for controlling the above motors will be discussed hereinafter. When the desired depth of cut is reached on blanks L at said slow speed, motor 75 is then deenergized and consequently again restricts sleeve 68 from rotation whereupon re-energization of motor 71 in a reverse direction to that previously mentioned will cause lead screw 66 to rapidly withdraw from sleeve 68 to move table 54 towards tool 52. The operation of the two feed mechanisms would be repeated in a similar manner for the fine generating of blanks L and the return of table 54 to its starting position at which time both feed motors as well as spindle drive motor 58 would be deenergized to permit removal of block B from spindle 50.

Figure 10:
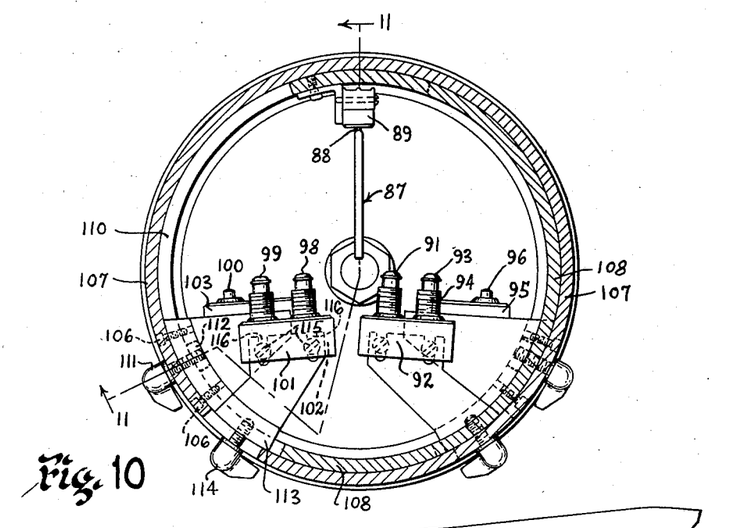
Fig. 10 is an enlarged sectional view taken on line 10—10 of Fig. 6 and looking in the direction of the arrows.
Figure 11:
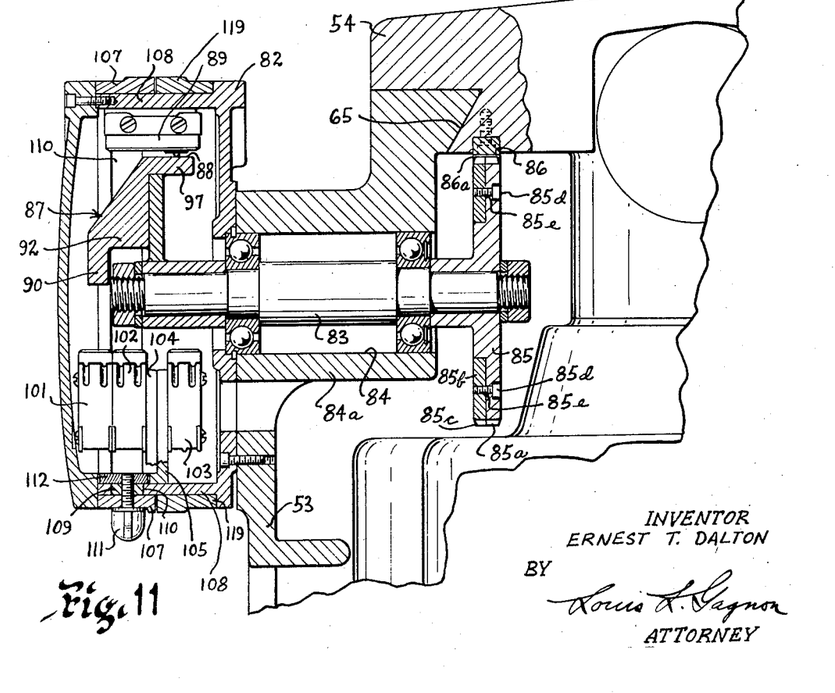
Fig. 11 is a fragmentary sectional view taken on line 11—11 of Fig. 10 looking in the direction of the arrows.

A control mechanism, Figs. 10 and 11, for automatically controlling the operation of motors 58, 71 and 75 is rigidly secured on the forward upper surface of base 53 and comprises a circular housing 82 into which one end of a shaft 83 projects. Shaft 83 is journaled in a rearwardly extending bore 84 of a protruberance 84a formed in the base 53. The opposed end of said shaft 83 is provided with a pinion 85 which, in turn, engages a rack 86 secured to the underside of table 54. Movement of table 54 will then cause rack 86 to rotate pinion 85 and consequently shaft 83.

In order to provide an intimate fit between the teeth 85a of the pinion 85 and the teeth 86a of the rack 86 so as to eliminate the effect of backlash, etc., therebetween and insure an accurate registry of the movement of table 54 by the extent of rotation of shaft 83, the pinion 85 is provided with an adjustable annular segment portion 85b which is, in turn, provided with teeth 85c of substantially the same shape and pitch as teeth 85a. Segment 85b is clamped to pinion 85 by studs 85d which extend through slotted openings 85e therein. Upon assembling rack 86 and pinion 85, the above-mentioned backlash inherent in conventional rack and pinion drives is eliminated by clamping segment 85b in a slightly rotated position relative to the body portion of pinion 85 so as to cause the leading surfaces of teeth 85a to engage one side of the adjacent teeth 86a of rack 86 and the trailing surfaces of the matching teeth 85c to simultaneously engage the opposed sides of teeth 86a of rack 86 whereby each of the combined teeth 85a and 85c will, upon meshing with rack 86, completely fill and intimately engage both sides of the adjacent spacing between teeth 86a of said rack.

The end of shaft 83 which projects into housing 82 is provided with a paddle-like switch actuating cam 87, rigidly secured thereon, which is adapted to alternately engage a plurality of electrical switches upon rotation of shaft 83.

Figure 4:
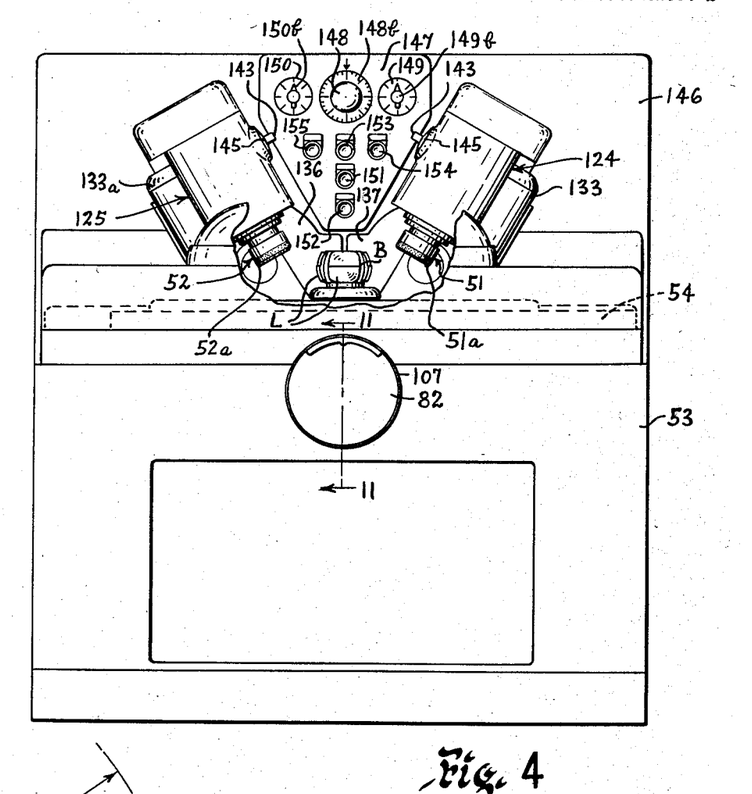
Fig. 4 is a front elevational view of the lens generating device embodying my invention.
Figure 6:
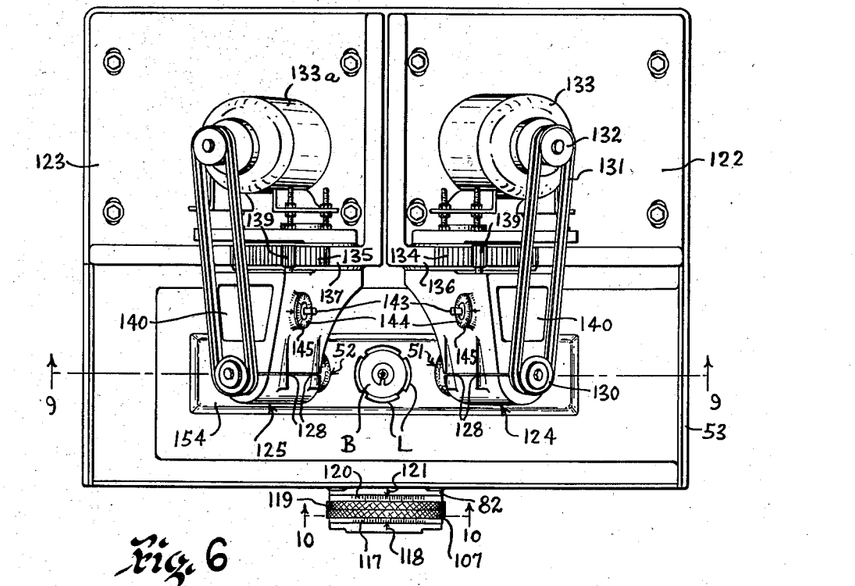
Fig. 6 is a top plan view of the device of Fig. 4 with portions of the protective coverings removed therefrom.

Said cam 87 is so aligned on shaft 83 as to be in a vertical or neutral position, as shown in Figs. 10 and 11, when the table 54 is in its initial starting position with block B midway between tools 51 and 52, as shown in Figs. 4, 6 and 9. When in said neutral position, the uppermost edge 88 thereof is in engaged relation with an electrical switch 89 which is rigidly secured to housing 82. Switch 89 functions to de-energize motors 58, 71 and 75 upon completion of a generating operation as will be described in detail hereinafter.

Movement of table 54 in a direction toward tool 51 by energizing motor 71 will then cause shaft 83 to rotate cam 87 in a clockwise direction, as viewed in Fig. 10, whereupon the lower portion 90 thereof, Fig. 11, will subsequently engage the plunger 91 of an electrical switch 92 which is adjustably mounted on housing 82. Switch 92 then functions to de-energize motor 71 and energize motor 75 at a point just prior to the engagement of lens blanks L with tool 51, so as to cause motor 75 to operate at its first-mentioned slow speed until blanks L reach a point immediately prior to engaging tool 51.

Figure 14:
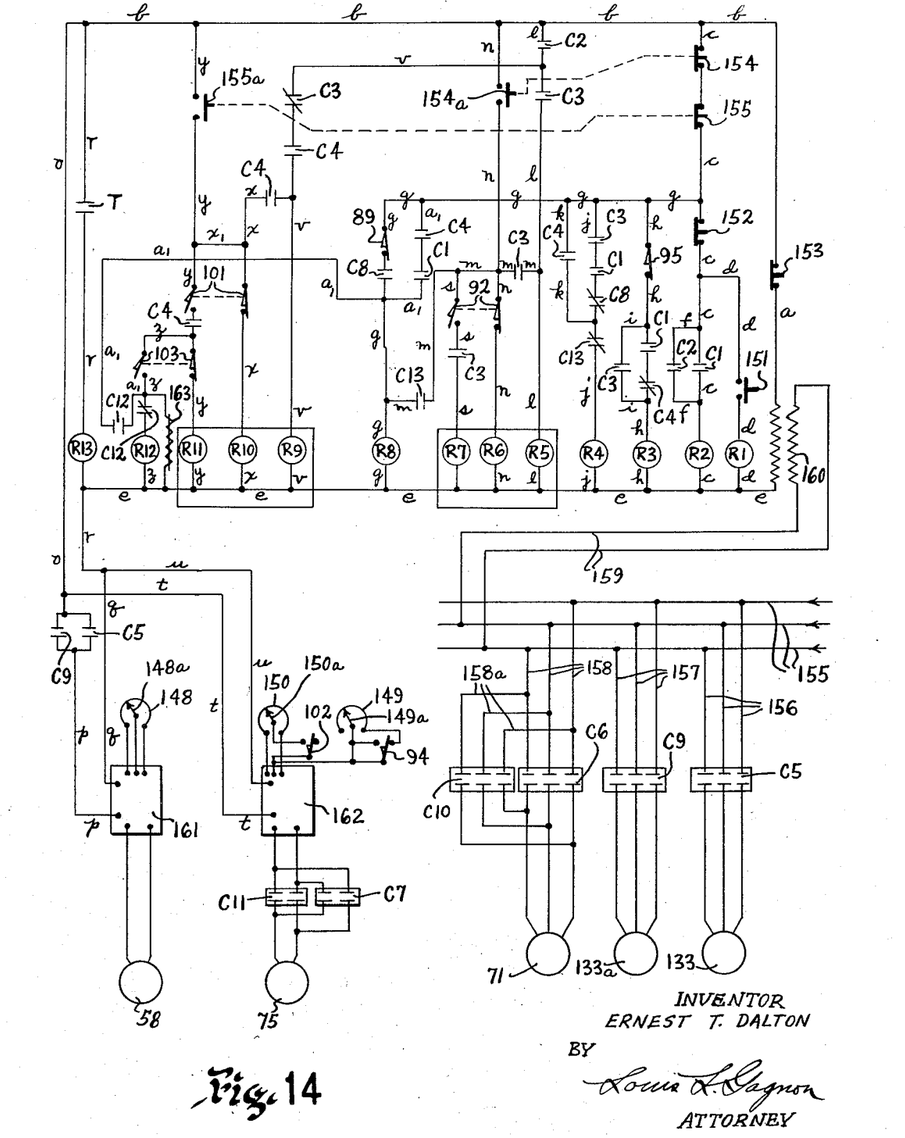
Fig. 14 is a schematic illustration of the electrical circuit for automatically controlling the operation of the above lens blank generating device.

Cam 87 meanwhile has continued to rotate and at the instant before blanks L engage tool 51, the area 92 of cam 87, Fig. 11, will engage plunger 93 of a second electrical switch 94 which switch, in turn, functions through the electrical control means of Fig. 14 to cause motor 72 to operate at its ultimate still slower speed throughout the cycle of the rough abrading of the RP curve on blanks L. Upon reaching the desired depth of cut, which is limited by adjustably positioning a third electrical switch 95 having a plunger 96 upon housing 83, the upper side surface 97 of cam 87 will then engage plunger 96 and cause switch 95 to function to de-energize motor 75 and energize motor 71 in a reverse direction to its initial starting direction of rotation and thereby cause table 54 to retract from tool 51 and proceed at a fast speed towards tool 52, as described hereinabove.

Said movement of table 54 towards tool 52 will then cause cam 87 to rotate in a counterclockwise direction, as viewed in Fig. 10, until it contacts the plungers 98, 99 and 100 of switches 101, 102 and 103, respectively, which function to control motors 71 and 75 through the circuits of Fig. 14 in a manner identical to that of switches 92, 94 and 95. Upon finally contacting plunger 100 of switch 103, cam 87 and table 54 are returned to their initial starting position by again electrically reversing the direction of rotation of the fast speed motor 71. Upon reaching its neutral position, the upper edge surface of cam 87 engages switch 89 which, in turn, de-energizes both motors 71 and 75 and motor 58 to permit removal of block B from spindle 50.

As previously mentioned, switches 92, 94, 95, 101, 102 and 103 are adjustably mounted within housing 82 to permit the location of the upper ends of the respective plunger portions 91, 93, 96, 98, 99 and 100 to be so positioned relative to each other and to the cam 87 as to properly control the extent of movement, speeds and directions of travel of table 54. By referring to one of the two groups of three switches, namely, 101, 102 and 103, it can be seen from Figs. 10 and 11 that this positioning is accomplished by mounting switches 101 and 102 upon a bracket 104 and switch 95 upon a similar shaped bracket 105. Bracket 105 is rigidly attached by means of studs 106 to an outer adjusting wing 107 rotatably mounted on an annular forwardly extending shouldered portion 108 of housing 82. Said studs 106 extend through ring 107 and are threadedly engaged in an integrally formed slide portion 109, Fig. 11, of the bracket 105 which is slidably fitted in a guide slot 110 of the shouldered portion 108. Rotation of ring 107 will then cause bracket 105 and switch 103 to rotate in unison and in order to retain said bracket in a desired adjusted position relative to cam 87, a clamp screw 111 is provided which extends through ring 107, slide portion 109 and threadedly engages a gib 112, Fig. 11, which upon tightening of clamp screw 111 will engage the inner surfaces of shoulder 108.

Since it is necessary to adjust bracket 104 and attached switches 101 and 102 relative to switch 103 for positioning the plunger 99 in proper relation with plunger 100 to determine the depth of cut in blanks, which depth is controlled by the extent of travel of cam 87 between plungers 99 and 100, bracket 104 is constructed similar to bracket 105 in that a slide portion 113, Fig. 10, is fitted into slot 110. However, bracket 104 is retained in its desired adjusted position on ring 107 solely by means of a clamp screw 114. Loosening of clamp screw 114 will permit bracket 104 to be slidably adjusted along ring 107.

Switches 101 and 102 may also be adjusted relative to each other upon bracket 104 by loosening screws 115 which may be moved in slots 116 of said bracket.

By properly adjusting switches 101, 102 and 103 and tightening screws 115 and 114, said switches may then be moved as a unit by loosening lock screw 111 and rotating ring 107 to a desired position relative to the neutral position of cam 87 and said movement is recorded by suitable indicia 117 provided on the outer surface of ring 107 to be matched with an indicating mark 118 on the stationary portion of housing 82. Said indicia is graduated to record the settings used to provide the desired RP curves on lens blanks mounted on various sized blocks B.

The above described switches 101, 102 and 103 in combination with the electrical circuits of Fig. 14 control the operation of table 54 in conjunction with the fine or finish abrading operation and switches 92, 94 and 95 are used to control the rough abrading operation in an identical manner and are also identically constructed and assembled for rotation with a second rotatable ring 119 positioned in side-by-side relation with ring 107 on shoulder 108 and having indicia 120 on the outer surface thereof to be aligned with an indiciating mark 121.

The abrading tools 51 and 52 are each located upon the generating device by means of supporting brackets 122 and 123, which are bolted or otherwise secured to the upper surface of base 53 thereof, Figs. 4, 6, 9 and 12. Each of said brackets are provided with spindle heads 124 and 125, respectively, which are pivotally mounted thereon at 51a and 52a in overhanging relation with the movable table 54. Said heads are each identically constructed and each comprise a spindle housing 126 fitted in a longitudinal bore 127 extending through the forward portion thereof, said spindle housing being clamped in said bore 127 by locking studs 128. A spindle 129 in each of heads 124 and 125 carrying an abrading tool at one end is journaled in housings 126 and is provided with pulleys 130 at the opposed ends which, in turn, are connected by belts 131 to additional pulleys 132 on the drive spindles of motors 133 and 133a mounted rearwardly of heads 124 and 125 respectively.

Radial racks 134 and 135 are provided upon each of the upstanding forward portions 136 and 137 of the respective brackets 122 and 123 each having their centers of curvatures located at pivot points 51a and 52a, respectively.

A drive arrangement for tilting the head 124 about pivot point 51a is illustrated on head 124 of Fig. 9 and it is to be understood that head 125 is identically constructed. Said drive arrangement embodies a pinion 138 in engaged relation with rack 134 and mounted for rotation in head 124. A worm follower 139 is mounted for axial rotation with pinion 138 and is positioned internally of a cavity 140, Figs. 6 and 9, formed in head 124. Said worm follower 139 is, in turn, engaged by a worm gear 141 which is secured to and rotatable with a transversely extending shaft 142 journaled in said head 124 and having an outwardly extending irregularly shaped end portion 143 to which a wrench or suitable handle may be detachably applied when angularly adjusting head 124. Rotation of shaft 142 will, through worm gear 141 and worm follower 139, cause pinion 138 to move along rack 134 and tilt head 124 about pivot point 51a. The angle of tilt is recorded by suitable indicia 144 provided upon an indicating plate 145 fixed for rotation upon the outwardly extending portion 143 of shaft 142.

The electrical circuit, Fig. 14, for controlling the above-described automatic operation of the generating device functions as follows:

The symbols R1 through R13 schematically represent electrical relays which electromagnetically function to close or open contacts C1 through C13 which are placed in the various lines of the circuit. Said contacts are each represented by a pair of short parallel lines illustrating a break or normally open circuit in its respective line. However, the contacts having a diagonal line shown therethrough, each illustrate a normally closed circuit in their respective line and when activated by a related relay, function to open or break the circuit.

The apparatus embodying the electrical equipment schematically illustrated in Fig. 14 is housed within an upstanding enclosure 146 attached to the rear portion of the generating device, as shown in Fig. 4, and a control panel 147 extends forwardly and centrally from said enclosure so as to be easily accessible.

Control panel 147 includes a conventional variac 148 for selectively controlling the speed of the work spindle motor 58 and a pair of conventional variacs 149 and 150 for similarly controlling the speed of slow feed motor 75 wherein variac 149 is used to control the rate of feed for rough generating and variac 150 controls the rate of feed for the fine or finish generating. Said variacs are each provided with movable rotor arms 148a, 149a, and 150a, Fig. 14, which are operated by indicating dials 148b, 149b and 150b respectively, Fig. 4. Push button switch 151 is used to start the generating cycle and push button 152 is used to stop the generating cycle whereas push button 153 is used to de-energize the complete control circuit including the work spindle motor 58 and the slow feed motor 75 for emergency purposes. Push button 154 is used to jog either the slow feed motor 75 or the fast feed motor 71 to the right and push button 155 is used to jog either of said motors to the left.

Said variacs and push buttons and motors are designated in Fig. 14 by like reference numerals and the control switches 89, 92, 94, 95, 101, 102 and 103 of Figs. 10 and 11 are also designated in Fig. 14 by like reference numerals.

It is pointed out that the contacts and switches of Fig. 14 are illustrated as being in the starting position. That is, all motors are de-energized and the work-carrying spindle 50 of table 54 is located centrally between tools 51 and 52 prior to a generating operation, as described above.

Current is initially fed to the electrical system by an alternating current three phase circuit 155 from which leads 156, 157, and 158 are connected to operate motors 133, 133a and 71. Leads 159 are, in turn, connected to one pair of wires of said three phase circuit to provide alternating voltage to the primary windings of a conventional 1 to 1 ratio transformer 160 which then acts through its secondary windings to provide a low voltage supply for operation of the remaining portion of the illustrated circuit.

The generating cycle is started by depressing push button 151 which acts to energize relays R1, R2, R3, and R4 in succession and simultaneously operate contacts C1, C2, C3, and C4. This is accomplished by supplying a flow of current from one side of transformer 160 through lead a, normally closed push button 153, lead b, lead c which includes normally closed push buttons 154, 155 and 152, lead d, push button 151, R1, lead e and to the opposed side of transformer 160. R1 then acts to operate all contacts C1 whereupon current will then flow from transformer 160, through lead a, push button 153, lead b, lead c, push buttons 154, 155, 152, C1, R2, lead e and to transformer 160. R2 being thus energized, all contacts C2 will operate whereupon R2 will be held energized through bypass lead f and C2. R3 is energized through a circuit from transformer 160, lead a, lead b, lead c and push buttons 154 and 155, lead g, lead h, closed switch 95, C1 which was closed by R1, normally closed C4, R3 and lead e to transformer 160. R3 will be held energized by bypass lead i and closed contact C3. R4 is energized through a circuit from transformer 160, lead a, lead b, lead c and push buttons 154 and 155, lead g, lead j including now closed contacts C3 and C1 and normally closed contacts C8 and C13, R4, lead e to transformer 160. R4 will be held energized by bypass lead k including now closed contact C4.

Upon releasing push button 151, R1 will again be deenergized and all contacts C1 will return to their initial open or closed condition.

With R2, R3 and R4 energized and its associated contacts C2, C3 and C4 operating as described above, relays R5, and R6 will be simultaneously energized through the following circuits:

R5 is energized through a circuit from transformer 160, lead a, lead b, lead l which includes now closed contacts C2 and C3, R5 and lead e to transformer 160.

R6 is energized through a circuit from transformer 160, lead a, lead b, lead l including now closed contacts C2 and C3, lead m including now closed contact C3, lead n including switch 92 having one side normally closed and R6 and lead e to transformer 160.

With relays R5 and R6 now energized, its associated contacts C5 and C6 will now operate to energize the rough grind tool motor 133 and the fast feed motor 71 to rotate in a direction suitable to drive table 54 and spindle 50 rapidly toward the rough grind tool 51 and also energize the work-spindle motor 58.

Motor 133 is energized by the closing of its contacts C5 to complete a circuit from lines 155 through leads 156.

Motor 71 is energized by the closing of its contacts C6 to complete a circuit from lines 155 through lines 158.

Motor 58 is energized through a circuit from transformer 160, lead a, lead b, lead o, now closed contact C5, and lead p which enters a conventional direct current rectifier and control unit 161 embodying the speed control variac 148, which unit converts the alternating current supplied thereto into direct current to operate the conventional direct current motor 58. The circuit then returns from unit 161 to transformer 160 through lead q, lead r and lead e.

With the table 54 of the generating device thus rapidly moving towards tool 51, the switch actuating cam 87, Figs. 10 and 11, ultimately approaches and activates switch 92 at a predetermined point spaced a given distance from the tool 51, as previously described.

Switch 92, being of a double contact type as schematically illustrated in Fig. 14 causes the circuit in line n to be opened by one set of its contacts and, consequently, relay R6 to be de-energized and its associated contacts C6 to return to their initial open position which opens the circuit through leads 158 to stop the fast feed motor 75. However, the other set of contacts in switch 92 simultaneously closes a circuit to energize relay R7. Said circuit from transformer 160 passes through lead a, lead b, lead l which includes now closed contacts C2 and C3, lead m which includes now closed C3, lead s which includes the now closed portion of switch 92 and closed C3, R7 and lead e back to transformer 160.

By so energizing R7, its associated contacts C7 are closed to provide a closed circuit to energize the slow speed drive motor 75. Said circuit passes from transformer 160 through lead a, lead b, lead o, lead t to a conventional direct current rectifier and control unit 162 which is similar in character to unit 161 and embodies a pair of variacs 149 and 150 for controlling the speed of motor 75. Variac 149 controls the motor speed for rough generating and variac 150 controls the motor speed for fine generating. The above circuit to control unit 162 now returns to transformer 160 through leads, *u, r,* and *e*.

It is noted at this point that with switch 94 in the position illustrated that the rotor arm 149a of variac 149 is bypassed and thus causes motor 75 to operate at its initial slow speed until table 54 and blanks L reach a point spaced a given distance from the tool 51 whereupon cam 87, Figs. 10 and 11, will function as described previously to actuate switch 94 which, in turn, will cause the variac rotor arm 149a to be connected in the variac circuits to unit 162 and enable the still further reduction of the speed of motor 75 in a conventional manner in accordance with the selected positioning of said arm by manipulation of the dial 149b at the control panel 147, Fig. 4.

With the lens blanks L now advancing into tool 51 at said further reduced slow speed, the above-mentioned cam 87 will next activate switch 95 at the point where the desired depth of cut on lens blanks L is achieved.

Upon activating switch 95, the circuit in line *h* is opened and, consequently, R3 is de-energized. This, in turn, returns all contacts C3 to their initial open or closed position. By so doing, relay R7 is de-energized which opens contacts C7 on slow speed motor 75 to stop same. Simultaneously, relays R9 and R10 are energized through the following circuits:

R9 is energized through a circuit from transformer 160, through lead *a*, lead *b*, lead *l* which includes now closed C2, lead *v* which includes normally closed C3 and now closed C4, R9, and lead *e* to transformer 160.

R10 is energized through a circuit from transformer 160 through lead *a*, lead *b*, lead *l* which includes now closed C2, lead *v* which includes normally closed C3 and now closed C4, lead *x* which includes now closed C4 and the normally closed portion of switch 101, R10, and lead *e* to transformer 160.

By thus energizing R9 and R10, contacts C9 and C10 are closed and the work-spindle motor 58 continues to operate through C9 which is located between leads *o* and *p*. The rapid feed motor 71 again is energized but in a reverse direction to its initial direction of rotation by the closing of contacts C10 in the reversed connecting lines 158a. The fine grinding tool spindle motor 133a is also energized by the closing of contacts C9 in its lines 157.

With the motors thus operating, the table 54 of the grinding device is rapidly moved towards the fine abrading tool 52 and upon reaching a predetermined point spaced a given distance from the tool 52, switch 101 is activated by cam 87 of Figs. 10 and 11. Switch 101 being of a double contact type similar to that of switch 92, then acts to open the circuit in lead *x* to de-energize R10 and close the circuit in lead *y* to energize R11.

By de-energizing R10, the rapid feed motor 71 is de-energized and stopped by the opening of C10 in lines 158a and by energizing R11, the slow feed motor 75 is energized to rotate in a reverse direction to its initial direction of rotation by the closing of contacts C11 in its leads from control unit 162. Switch 102, however, being in its opened position as illustrated, disconnects the rotor arm 150a of variac 150 to cause motor 75 to operate at its initial slow speed thus continuing to move lens blanks L toward tool 52. At a point immediately prior to the engagement of lens blanks L with tool 52, however, cam 87, Figs. 10 and 11, actuates switch 102 to connect the rotor arm 150a into an electrical circuit through the variac 150 to then cause motor 75 through control unit 162 to operate at a still slower predetermined speed in accordance with the setting of said arm 150a. The finish generating of lens blanks L then proceeds until the desired depth of cut is reached at which time cam 87, of Figs. 10 and 11, actuates switch 103 which is also a double contact type similar to 101 and 92. Switch 103 then opens the circuit in lead *y* to de-energize R11 and closes the circuit in lead *z* to energize R12.

By so de-energizing R11, contacts 11 are opened and motor 75 is stopped.

When R12 is energized, contacts C12 are operated and provide a closed circuit through a conventional timing device 163 such as a cycleflex timer or the like. This timing device provides a controlled delay in the movement of table 54 to permit the fine generating tool 52 to completely clear the RP surfaces of lens blanks L while table 54 remains momentarily stationary at the end of the feed cycle. This provides a superior fine generated finish on said RP surfaces.

By the closing of contacts 12, a circuit is provided through R8 to energize same. Said circuit is as follows: from transformer 160, lead *a*, lead *b*, lead *l* including now closed C2, lead *v* including now closed C3 and now closed C4, lead *x* including now closed C4, lead $x_1$, lead *y* including the now closed portion of switch 101 and C4, lead *z* through the now closed portion of switch 103, lead $a_1$, including now closed contact C12, lead *g* through R8, and lead *e* back to transformer 160. R8 will then be held in its energized condition by the closing of contact C8 in line *g*.

At the end of the timing cycle of timer 163, contact T in lead *r* which is operated by timer 163, closes. This energizes R13 and closes C13 in lead *m*. R13 is now energized through a circuit from transformer 160, lead *a*, lead *b*, lead *r* including now closed contact T and R13, lead *e* to transformer 160.

By closing contact C13 in lead *m*, relay R6 is again energized through a new circuit. Said circuit from transformer 160 passes through lead *a*, lead *b*, lead *c* including closed push buttons 154 and 155, lead *g* including closed switch 89 and now closed contact C8, lead *m* including now closed C13, lead *n* including the now closed portion of switch 92, R6 and lead *e* to transformer 160.

By thus energizing R6, contacts C6 will close in lines 158 to operate the rapid feed motor 71 in its original starting direction of rotation to cause table 54 of the generating device to travel back toward its initial starting position midway between tools 51 and 52. Upon reaching said starting position, cam 87, Figs. 10 and 11, will then actuate switch 89 and open the circuit in lead *g* thus de-energizing R8 and consequently causing contact C8 to open and simultaneously open the circuit to R6 which will open contacts C6 on motor 71 to stop the table 54 at said starting position. The work-spindle motor 58 and the tool motor 133a had previously been stopped when relay 13 was energized since R13 had opened the normally closed contact C13 in lead *j* which had de-energized R4 which, in turn, opened contact C4 in lead *v* to also de-energize R9. R9 then acted to open contacts C9 in the leads to both the motors 133a and 58.

The above-described automatic generating operation would then be again repeated by depressing the cycle start push button 151.

In order to jog the table 54 along its path of travel in either direction independently of the above automatic cycling operation for purposes of aligning the various parts of the machine during a setting up operation or the like, a pair of jog push buttons 154 and 155 are provided in the circuit. Said push buttons function to move table 54 only when depressed and the movement instantly stops when they are released.

The operation of push buttons 154 and 155 is as follows:

Push button 154 is used to jog the table 54 to the right or in the direction of tool 51. By depressing button 154, the electrical circuit to relays R1, R2, R3 and R4, which passes through lead *c*, is opened thus preventing the automatic cycling operation, described above, from functioning. Push button 154 has a second contact portion 154a interconnected therewith which closes a direct circuit to either relay R6 or R7 depending upon the position of switch 92 when the button 154 is depressed.

If it is desired to jog the fast feed motor 71 to move table 54 to the right, switch 92 would be in the position illustrated in Fig. 14 whereupon the closed circuit to R6 would be from transformer 160 through lead *a*, lead *b*, lead *n* now including closed switches 154*a* and 92 through R6 and lead *e* to transformer 160.

If, however, the slow feed motor 75 were in operation at the time it was desired to jog the table 54 to the right, switch 92 would be positioned so that the circuit in lead *n* to R6 would be opened and a circuit from lead *n* through lead *m* and lead *s* including the now closed portion of switch 92 and C3 would then energize R7.

As described previously, R7 closes contacts C7 in lines to motor 75 and R6 closes contacts C6 in lines to motor 71. Moreover, contacts C6 and C7 operate to cause their respective motors to move table 54 towards tool 51.

Push button 155 operates in a manner identical to button 154 and its second contact 155*a* when closed, energizes either R10 or R11 depending on the position of switch 101 at the time of operation. If switch 101 is in the position illustrated, R10 would be energized through a circuit from transformer 160, lead *a*, lead *b*, lead *y* including now closed button 155*a*, lead $x_1$, lead *x* including closed portion of switch 101, R10 and lead *e* to transformer 160.

If switch 101 were positioned so as to close lead *y* and open lead *x*, R11 would be energized directly through lead *y*. Again, R10 and R11 function to close contacts C10 and C11 when energized to close circuits to their respective motors and operate same so as to move table 54 to the left or toward tool 52.

Push button 153 is positioned directly in the control circuit line for emergency purposes. That is, by depressing button 153, the complete control circuit is de-energized and all of the motors are instantly stopped. Upon releasing push button 153, the motors will remain de-energized since all the relays have been de-energized. However, the cycle may again be started by depressing the cycle start button 151.

Figure 13:
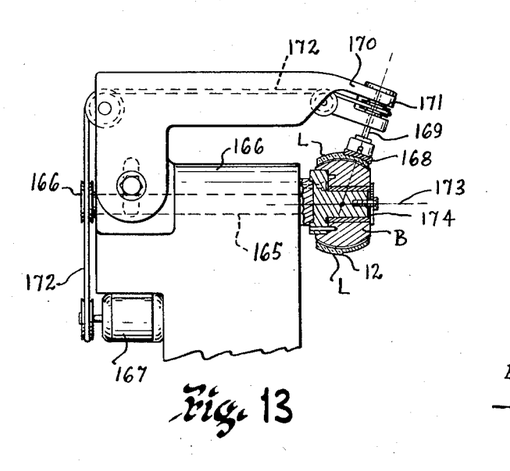
Fig. 13 is a diagrammatic illustration of a type of polishing apparatus to be used in connection with the embodiment of my invention.

Having generated the RP curve and lens blanks L in the manner described above, block B is then removed from the generating device. The generated surfaces thereof are then provided with an optically polished finish by means of a suitable polishing apparatus. A diagrammatic illustration of such an apparatus is shown in Fig. 13 wherein the block B is positioned upon one end of a rotatable shaft 165 journalled in a base 166 of said apparatus. Shaft 165 is powered by a pulley 166 and belt 172 which is, in turn, connected to any suitable source of power such as an electric motor or the like 167. A circular polishing pad 168, having a lens engaging surface preformed to substantially match the curvature of the lens surface to be polished and preferably formed of a suitable plastic composition or any of the conventional polishing materials known to the trade is positioned in engaged overlying relation with the above generated reading portion surfaces, as illustrated in Fig. 13. Said polishing pad 168 is mounted at one end of a supporting spindle 169 which is journalled in an angularly disposed supporting head 170 and is rotated about its axis by a pulley 171 and belt 172, which belt 172 functions to rotate both spindle 169 and shaft 165, as illustrated.

Since the center of curvature of the generated RP curve on the lens blanks L is located along the axis of rotation 173 of block B at the point of intersection 174 of a plane through the dividing line 12 of the blocked lens blanks L, it will be noted that the axis of spindle 169 is tilted about said center of curvature 174 to cause the lens engaging surface of the polishing pad 168 to properly seat upon the RP surfaces of lens blanks L. The polishing procedure is then accomplished by rotation of block B and polishing pad 168.

By the proper selection of a conventional polishing medium to be applied to the lens blanks L and polishing pad 168, the lens blanks and polishing pad may be rotated at relatively high speeds to reduce the time of polishing.

The finished lens blanks L are then removed from block B.

However, each of the above lens blanks are adapted to be ground and polished on the concave sides thereof with any prescribed curvature necessary to give the powers in fields 10 and 11 of the finished lenses in accordance with the prescriptive requirements of particular individual wearers.

From the foregoing, it can be seen that improved, simplified and economical means and method of manufacturing multifocal lenses has been proxided for obtaining all the objects and advantages of the invention. However, it is apparent that many changes in the details of construction, arrangement of parts and the steps in the process may be made without departing from the spirit of the invention and the invention should not be limited to the exact matters shown and described as only the preferred matters have been shown and described by way of illustration only.

Having described by invention, I claim:

1. The method of simultaneously forming one-piece lens blanks for use in producing lenses having distance and near vision focal fields with a substantially straight transversely extending line of division between said fields, comprising abrading on one side of each of said blanks a first continuous finished spherical optical surface to a radius of curvature which is that desired for said side of the distance fields of the finished lenses, mounting said blanks on the periphery of a rotatable blocking wheel with the axes of said first finished optical surfaces lying in a single plane and intersecting each other at a given common point on the axis of rotation of said blocking wheel and with said surfaces being substantially equidistant from said common point, said distance being controlled in accordance with the radius of curvature to be formed on the near vision portions of said blanks, rotating said blanks in said supported relation as a unit about the axis of said blocking wheel, engaging a substantial area of each of said blanks during the rotation thereof with abrading means having a shape controlled to produce on each of said blanks a second spherical surface of a shorter radius of curvature and simultaneously locating an edge of said abrading means relative to said blanks so that the direction of movement caused by said rotation of said supported blanks relative to said abrading means will cause said edge to produce a relatively straight cliff-like dividing line extending transversely of each of sand lens blanks between said first and second spherical surfaces.

2. The method of simultaneously forming one-piece lens blanks with a plurality of focal fields in monaxial relation with each other and having a substantially straight transversely extending line of division between said fields, comprising abrading on each of said blanks a first continuous finished spherical optical surface to a radius of curvature which is that desired for the distance fields of the finished lenses, mounting said blanks on the periphery of a rotatable blocking wheel with the axes of said first finished optical surfaces lying in a single plane and intersecting each other at a given common point and with said surfaces being substantially equidistant from said common point, said distance being controlled in accordance with the radius of curvature to be formed on the reading portion of each of said blanks, rotating said blanks in said supported relation as a unit about the axis of rotation of said blocking wheel, simultaneously engaging a substantial area of each of said blanks with abrading means for producing on each of said blanks a second spherical surface of a shorter radius of curvature than said first optical surface, and which second surfaces have their centers of curvature located at said given common point, and simultaneously causing an edge of said abrading means to produce a relatively straight transversely extending cliff-like dividing line across each of said lens blanks between said first finished spherical optical surface and said second spherical optical surface.

3. The method of simultaneously forming one-piece lens blanks for use in producing lenses having distance and near vision focal fields in monaxial relation with each other and having a substantially straight transversely extending line of division between said fields, said method comprising mounting a plurality of blanks each having a first spherically curved surface on one side thereof on the periphery of a rotatable blocking wheel with the centers of said first surfaces lying in a single plane intersecting a given common point on the axis of rotation of said blocking wheel and with said surfaces being substantially equidistant from said common point, the distance being controlled in accordance with the radius of curvature to be formed on the near vision portions of said blanks, rotating said blanks in said supported relation as a unit about the axis of said blocking wheel, engaging a substantial area of the first curved surface of each of said blanks with rotating abrading means having an effective abrading portion of a shape controlled to produce on each of said blanks a spherical surface of a shorter radius of curvature than the first curved surfaces and continuing said engaging of said blanks with said abrading means until the centers of curvatures of said surfaces of shorter radii assume a coincident relation with said given common point and simultaneously causing an edge of said abrading means to produce relatively straight transversely extending cliff-like dividing lines across said lens blanks between the remainders of said first curved surfaces and said second spherical surfaces of shorter radii of curvatures.

4. The method of simultaneously forming a plurality of one-piece lens blanks with distance and near vision focal fields in monaxial relation with each other and having a substantially straight transversely extending cliff-like line of division between said fields and passing through the position at which the optical centers of said fields are to be located, comprising mounting blanks having a first continuous spherical surface on one side thereof about the periphery of a rotatable blocking wheel with said surfaces exposed and with the centers of each of said first surfaces lying in a single plane normal to and intersecting the axis of rotation of said blocking wheel substantially at a given point thereon, said first spherical surfaces being located substantially equidistant from said axis of rotation, which distance is controlled in accordance with the radius of curvature to be formed on each of the near vision portions of said lens blanks, rotating said blocking wheel and lens blanks as a unit about said axis of rotation, supporting in abrading relation with said first spherical surfaces of the lens blanks cup-shaped rotatable lens blanks abrading means having curve generating characteristics such as to produce during the simultaneous rotation of said wheel and abrading means about their respective axes the spherical curvature desired for the near vision portions of said lens blanks and locating an edge of said abrading means so as to engage said first surfaces along a line passing through the positions at which the optical centers of the focal fields are to be located, moving said lens blanks and abrading means relative to each other by an amount sufficient to and in a direction so as to abrade said near vision surfaces and to cause the centers of curvatures of said near vision surfaces to simultaneously become substantially coincident with said given point, whereby spherical curvatures will be produced on said near vision portions in monaxial relation with the first continuous spherical surfaces of said distance portions and a substantially straight transversely extending cliff-like line of division will be simultaneously produced between said distance and near vision portions and in substantially intersecting relation with the position at which said optical centers are to be located in the finished lenses.

5. The method of simultaneously forming a plurality of one-piece lens blanks each with distance and near vision focal fields in monaxial relation with each other and having a substantially straight transversely extending line of division between said fields and passing through the position at which the optical centers of said fields are to be located, said method comprising abrading on one side of each of said blanks a first continuous finished spherical optical surface which is of the radius of curvature desired for the distance portion of the finished lens blanks, mounting said lens blanks about the periphery of a rotatable blocking wheel with the centers of each of said first finished spherical optical surfaces lying in a single plane normal to and intersecting the axis of rotation of said blocking wheel at a given point thereon, said first finished optical surfaces being located substantially equidistant from said axis of rotation which distance is controlled in accordance with a shorter radius of curvature to be formed on the near vision portion of each of the blanks, rotating said blocking wheel and said lens blanks as a unit about said axis of rotation and abrading a second spherical surface on each of said first finished spherical optical surfaces of said lens blanks by positioning abrading means having an abrading surface shaped to produce the radii of curvature desired of said near vision portions of the blanks against said first finished optical surfaces of the lens blanks, controlling the positioning of said abrading means relative to said blanks to cause an edge part of the abrading surface thereof to engage said first finished spherical optical surfaces along a line passing through the position at which the optical centers of the finished focal fields are to be located, producing relative movement between said abrading means and said rotating unit of supported lens blanks toward each other by an amount sufficient to abrade said near vision surfaces and to cause the centers of curvature of said near vision surfaces to simultaneously become substantially coincident with said given point, whereby given spherical curvatures will be produced on said near vision portions in monaxial relation with the curvatures of said distance portions and a substantially straight transversely extending line of division will be simultaneously produced between said distance and near vision portions and in intersecting relation with the position at which said optical centers are to be located in the finished lenses.

6. The method of simultaneously forming a plurality of one-piece lens blanks from which lenses each having a plurality of different focal fields and having a cliff-like line of division extending between said fields from one side edge of the lens to the other may be produced, said method comprising mounting a plurality of lens blanks having a first substantially spherically curved surface on one side thereof on the periphery of a rotatable blocking wheel in fixed adjacent edge-to-edge relation with each other in a circular path and with said first curved surfaces being exposed and substantially equally spaced from the axis of rotation of said blocking wheel a distance greater than a shorter radius of curvature to be formed on second fields of the finished lenses and with the centers of said curved surfaces lying substantially in a single plane normal to and passing through a common point on the axis of rotation of the blocking wheel, and such that the centers of said shorter radii of curvature of said second fields when formed to the final depth desired will meet substantially at said common point, rotating said blanks in said supported relation as a unit about said axis, engaging portions of said exposed surfaces of said blanks onto which said second fields are to be formed, during the rotation of said blanks about said axis, with a rotating abrading tool having its effective abrading portion provided with a shape which is controlled to produce the radii of curvature desired on said second fields of the blanks and supported so that the center of curvature of said second fields as formed by said effective abrading portion will assume a substantially coincident relation with said common point at the completion of the generation of said second fields, said tool having an edge portion located to engage said blanks along a transverse line in the direction of rotation of said blanks, and moving said blanks and said tool, one toward the other, by an amount which will cause said tool to abrade said second fields to the curved shapes desired and to a depth sufficient to locate the centers of the curvatures produced by said effective abrading portion of the tool in substantially coincident relation with said common point and to simultaneously produce said transversely extending cliff-like lines of division between said first and second fields.

7. The method of simultaneously forming one-piece lens blanks from which lenses having a plurality of focal fields and having transversely extending cliff-like lines of division between said fields may be produced, comprising mounting a plurality of lens blanks each having a first continuous curved surface on one side thereof in substantially edge-to-edge relation with each other about the periphery of a rotatable wheel-like block with said sides of the blanks having said first continuous curved surfaces thereon being exposed and spaced from the axis of rotation of said block a distance greater than a shorter radius of curvature than said first curved surfaces which is to be formed on other fields of the blanks, the difference between said distance and said shorter radius of said curvature of said other fields being of a controlled amount in accordance with the depth desired of the cliff-like lines of division to be formed, and such that the centers of said shorter radii of curvatures of said other fields, when said other fields are formed to said depth, will substantially meet at a common point lying on the axis of rotation of the block, rotating said block having the blanks supported thereon about its axis, engaging portions of said first continuous curved surfaces of said blanks onto which said other fields are to be formed with a first rotating abrading means having an effective abrading face of a shape such as to produce the curvature desired on said other fields and simultaneously locating and edge portion of said abrading means so as to engage said blanks along a transverse line passing across said first continuous curved surfaces of said blanks, moving said blanks and said first abrading means, one toward the other, by an amount which will cause said first rotating abrading means to abrade the engaged portions of said first continuous curved surfaces to produce the curvature desired of said other fields on said blanks and to simultaneously form cliff-like lines of division between said other fields and the remaining portions of said first continuous curved surfaces and in such manner as to simultaneously cause the free edge of each of said cliff-like lines of division to have an excess of material, engaging said blanks with a second rotating abrading means to finish-abrade said lens blanks and to simultaneously remove said excess of material from said free edges of said cliff-like lines of division, whereby flakings which may have been introduced in said free edges during the initial forming of said cliff-like lines of division may be removed and thereby produce relatively sharp free edges on said cliff-like lines of division.

8. The method of simultaneously forming one-piece lens blanks with distance and near vision focal fields in monaxial relation with each other and having a substantially straight transversely extending cliff-like line of division between said fields comprising mounting lens blanks having a first continuous finished spherical optical surface which is of the radius of curvature desired for the distance portion of the finished lens blanks about the periphery of a rotatable blocking wheel with the axes of said first finished spherical optical surfaces lying in a single plane and each intersecting the axis of rotation of said blocking wheel substantially at a given common point on said axis, and with said first finished optical surfaces located substantially equidistant from said point, said distance being controlled in accordance with the radius of curvature to be formed on the near vision portions of each of the blanks, rotating said blanks in said supported relation as a unit about said axis of said blocking wheel and abrading a second spherical surface on a substantial area of said first finished spherical optical surface of each of said lens blanks while simultaneously producing a substantially straight transversely extending line of division between said first finished spherical optical surfaces and said second near vision spherical surfaces by positioning a first abrading means having an effective abrading portion of a shape controlled to produce the radius of curvature desired of the near vision portions of the blanks against said first finished optical surfaces of said blanks, controlling the positioning of said abrading means to cause an edge part of the effective abrading portion thereof to engage said first finished spherical optical surfaces at a location thereon slightly spaced to one side of points on said first finished spherical optical surfaces at which the optical centers of said first surfaces are to be located in the finished lenses and with a part of said effective abrading portion overlying a substantial area of said first finished spherical optical surfaces of the lens blanks, producing relative movement between said first abrading means and said unit of supported lens blanks toward each other to cause a second semi-finished spherical surface to be formed on each of said lens blanks to a depth approaching that desired of the final near vision surface, and to simultaneously produce a substantially straight transversely extending line of division between said first and second spherical surfaces and in offset relation with said points which establish the optical centers of said first spherical surfaces on the side thereof toward said semi-finished spherical surfaces, positioning a second abrading means having an effective abrading portion of a shape controlled to produce the final radius of curvature desired of said near vision portions over said second semi-finished surfaces, controlling the positioning of said second abrading means to cause an edge part thereof to engage said first finished spherical optical surfaces at a location thereon intersecting said points which establish the location of the optical centers of said first spherical surfaces and with a part of said second abrading means overlying a part of the area of said semi-finished surfaces, producing relative movement between said second abrading means and said rotating unit of supported lens blanks toward each other to cause the central axes of the final spherical surfaces formed by said second abrading means to intersect said common point on said axis about which said lens blanks are rotated to produce the desired final spherical surface curvature thereon and simultaneously causing said straight transversely extending line of division between said first and second final spherical surfaces of said lens blanks to extend through said points which establish the optical centers of said first finished spherical optical surfaces.

9. The method of simultaneously forming a plurality of one-piece lens blanks from which lenses having distance and near vision fields and having substantially straight transversely extending cliff-like lines of division between said fields may be produced, said method comprising abrading a plurality of lens blanks to form a first continuous finished optical surface on one side thereof of a predetermined radius of curvature which is such as to substantially control in part the resultant prescriptive power desired in the distance focal fields of the finished lenses, mounting said blanks on the periphery of a rotatable blocking wheel in fixed adjacent edge-to-edge relation with each other and with said finished optical surfaces exposed and substantially equally spaced from the axis of rotation of said blocking wheel a distance greater than a shorter radius of curvature than said first surfaces to be formed on said near vision fields, the difference between said distance and said radius of said curvature of said near vision fields being of an amount substantially equal to the depth desired of the cliff-like line of division to be formed, and such that the centers of said shorter radii of curvatures of said near vision fields when formed to said depth will meet at a common point lying on the axis of rotation of the blocking wheel, rotating said blocking wheel and blanks in said supported relation thereon about said axis of rotation of said blocking wheel, engaging portions of said first continuous surfaces of said blanks onto which said other fields are to be formed, during the rotation of said blanks about said axis, with a first rotating abrading tool having a relatively coarse grained effective abrading face provided with a shape which will produce a semi-finished surface of a radius of curvature approaching that desired on said near vision fields and supported so that the centers of said curvatures will approach a coincident relation with said common point at the completion of the generation of said surfaces by said first tool, said first tool having an edge portion located to engage said blanks along a first transverse line passing near and slightly to one side of points on said finished optical surfaces of said blanks at which the optical centers of the finished lenses are to be located, said one side being the side of said blanks on which said near vision fields are to be formed, moving said blanks and said first tool, one toward the other, by an amount which will cause said first tool to rough abrade said near vision fields to substantially the curved shapes desired and to a depth sufficient to cause the centers of the curvatures produced by said first tool to approach a coincident relation with said common point and to simultaneously produce a first straight transversely extending cliff-like line of division between said surfaces of said blanks at a location near and slightly to said one side of said points at which the optical centers of the finished lenses are to be located, engaging said rough abraded fields with a second rotating abrading tool having a fine grained effective abrading face of a shape which is such as to produce the radius of curvature desired of said near vision fields, said second tool being supported so that the centers of curvatures formed on said near vision fields will assume a substantially coincident relation with said common point at the completion of the generation of said near vision fields, said second tool having an edge portion located to engage said blanks along a second transverse line passing through said points at which the optical centers of the finished lenses are to be located and moving said blanks and said second tool, one toward the other, by an amount which will cause said second tool to finish abrade said near vision fields to the curved shapes desired and to a depth such as to locate the centers of curvatures of said near vision fields in substantially coincident relation with said common point and to simultaneously remove said first cliff-like lines of division and produce second and final cliff-like lines of division between said distance and near vision fields.

References Cited in the file of this patent

UNITED STATES PATENTS

| | | |
|---|---|---|
| 2,310,925 | Bardwell | Feb. 16, 1943 |
| 2,352,146 | Desenberg | June 20, 1944 |
| 2,399,706 | Rones | May 7, 1946 |
| 2,510,113 | Holman | June 6, 1950 |
| 2,554,070 | Stead | May 22, 1951 |
| 2,582,087 | Turner et al. | Jan. 8, 1952 |
| 2,595,760 | Butler | May 6, 1952 |
| 2,643,491 | Burroughs | June 30, 1953 |
| 2,643,492 | Burroughs | June 30, 1953 |
| 2,649,667 | Cooke | Aug. 25, 1953 |
| 2,683,342 | Dalton | July 13, 1954 |
| 2,734,322 | Vaughan | Feb. 14, 1956 |